United States Patent [19]

Lipo

[11] 4,001,660
[45] Jan. 4, 1977

[54] REGULATING THE TORQUE OF AN INDUCTION MOTOR

[75] Inventor: Thomas A. Lipo, Schenectady, N.Y.

[73] Assignee: General Electric Company, Schenectady, N.Y.

[22] Filed: Jan. 2, 1975

[21] Appl. No.: 538,009

[52] U.S. Cl. .............................. 318/227; 318/230; 318/231

[51] Int. Cl.² ......................................... H02P 5/40

[58] Field of Search .................. 318/227, 230, 231

[56] References Cited

UNITED STATES PATENTS

| | | | |
|---|---|---|---|
| 3,500,158 | 3/1970 | Landau et al. ..................... | 318/227 |
| 3,512,067 | 5/1970 | Landau ............................. | 318/227 |
| 3,619,749 | 11/1971 | Scheiman ......................... | 318/231 |
| 3,824,437 | 7/1974 | Blaschke ......................... | 318/227 X |
| 3,909,687 | 9/1975 | Abbondanti ...................... | 318/227 |

Primary Examiner—Gene Z. Rubinson
Attorney, Agent, or Firm—Donald R. Campbell; Joseph T. Cohen; Jerome C. Squillaro

[57] ABSTRACT

A motor control circuit and method for regulating the torque of an ac induction motor operated at a variable frequency utilizes as a controlled variable the modified in-phase component of stator current which is compensated for the voltage drop across the stator resistance. Both positive and negative torque are approximately linear assuming the slip frequency is changed linearly, and only the per phase line current and voltage are sensed. A traction application is described.

7 Claims, 4 Drawing Figures

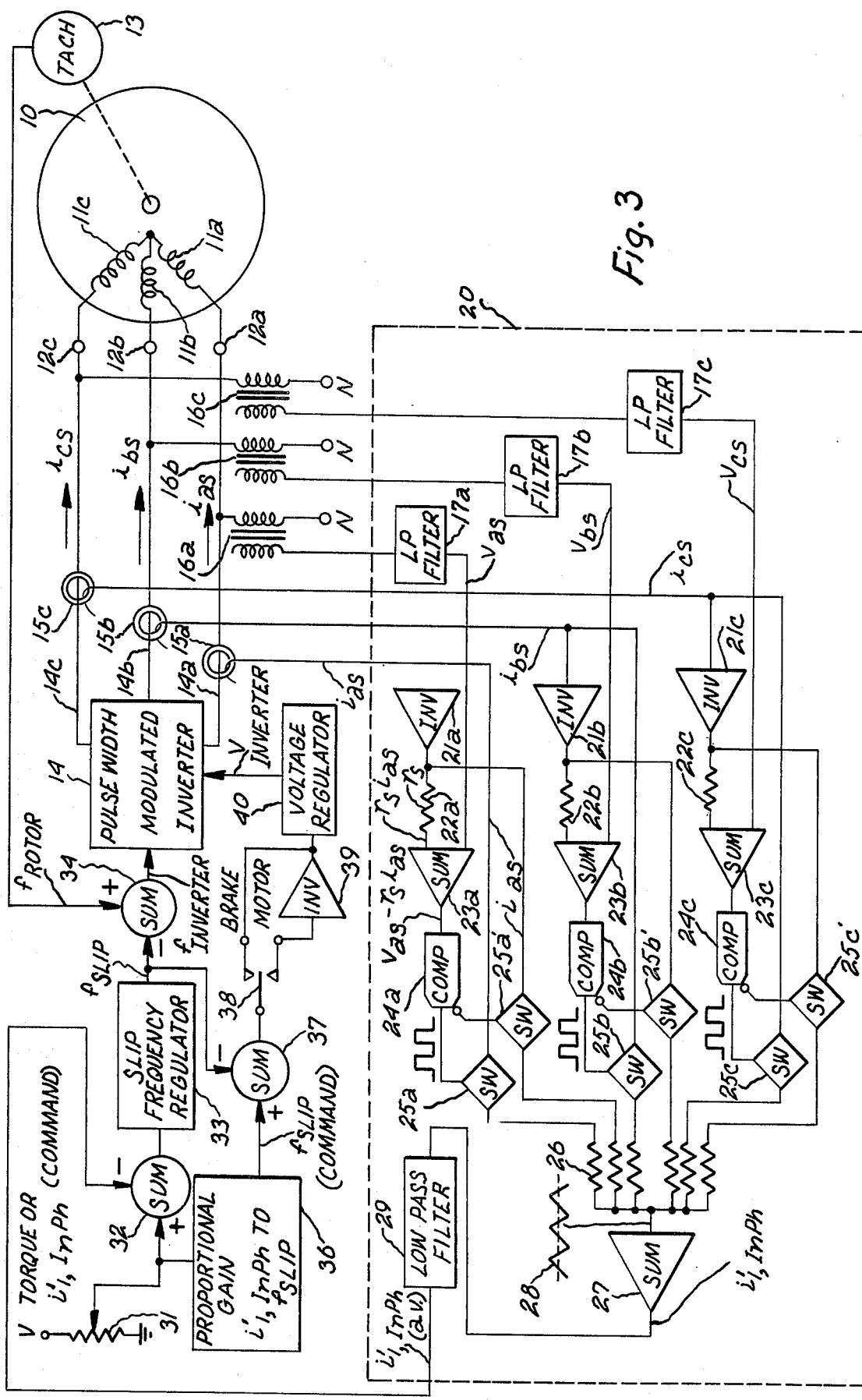

REGULATING THE TORQUE OF AN INDUCTION MOTOR

BACKGROUND OF THE INVENTION

This invention relates to a motor control circuit and method for regulating the torque of an induction motor, and more particularly to regulating the torque of an induction motor operated at a variable frequency using a modified in-phase component of stator current as a controlled variable.

Most traction applications specify precise regulation of motor torque so as to provide smooth, controlled acceleration. Smooth control of a subway car or a trolley car, for example, is needed for passenger comfort. In the application of ac induction motors to such applications in an adjustable speed, variable frequency drive system, precise control of torque is hindered by the fact that no single variable which is directly proportional to torque is readily measurable. The torque is proportional to the air gap flux per pole and to the in-phase rotor current, however the present invention relates to a technique that avoids the need for sensing the air gap flux.

SUMMARY OF THE INVENTION

In accordance with the invention, a motor control circuit for regulating the torque of a polyphase or single phase ac induction motor operated at a variable frequency is based on the principle of maintaining constant the in-phase component of stator current compensated for the voltage drop across the stator resistance while also holding constant the slip frequency. To implement this control technique, the per phase instantaneous stator supply line current and voltage is continuously sensed and supplied to a generating means for deriving the per phase supply line voltage corrected for the stator resistance voltage drop. The compensated supply line voltage signal is then used in conjunction with the instantaneous current sensor signal to generate the desired modified in-phase stator current component signal, either in one half cycle or in both half cycles. In a polyphase circuit or whenever appropriate, the several modified in-phase stator current component signals are summed and filtered to produce an averaged dc signal to be used in the feedback control system for the power converter supplying adjustable frequency and amplitude voltage to the motor.

The preferred embodiment is a drive system for a three phase induction motor wherein the power converter is a polyphase pulse width modulated inverter. In one feedback control circuit, the error between the averaged dc signal and a command signal representing the desired torque is used to actuate a slip frequency regulator, thereby generating a slip frequency signal which is summed with a rotor frequency signal to produce a first control signal for determining the inverter operating frequency. In the second feedback control circuit, a command slip frequency signal and the aforementioned slip frequency signal are summed to generate a second error signal, this being used to actuate a voltage regulator for producing a second control signal for determining the voltage amplitude of the inverter. In a motor position, the second error signal is inverted at the input of the voltage regulator, but is uninverted in a brake position. Although other applications are possible, this torque regulating motor controller is advantageous in traction applications. Both positive and negative torque are approximately linear. A method for regulating the torque of an induction motor is in accordance with the foregoing description.

BRIEF DESCRIPTION OF THE DRAWINGS

FIG. 3 is a schematic circuit diagram in block diagram form of the preferred embodiment of a polyphase motor control circuit constructed according to the invention.

DESCRIPTION OF THE PREFERRED EMBODIMENT

The theory and principles underlying the invention will be discussed with regard to FIG. 1 before proceeding to a detailed description of the exemplary torque regulating motor control circuit of FIG. 3 for use in an adjustable speed polyphase ac induction motor drive system especially suitable for traction applications. Within its broader scope, the present induction motor control circuit can be constructed in single phase versions and is useful in a wide variety of applications where the smooth or approximately linear control of induction motor torque is required or is desirable.

Figure 1:
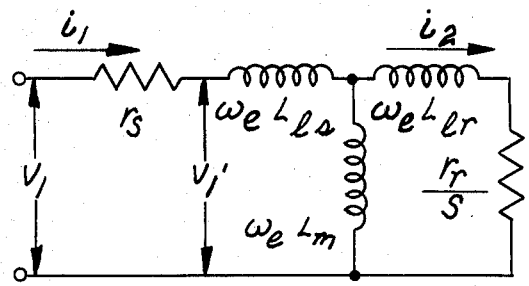
FIG. 1 is a schematic diagram showing a per phase equivalent circuit of a three-phase induction motor.

FIG. 1 shows the well-known per phase equivalent circuit of a three-phase induction motor, which is similar to the usual transformer equivalent circuit. In this diagram, the stator resistance $r_s$, the stator leakage reactance $\omega_e L_{ls}$ and the magnetizing reactance $\omega_e L_m$ are effectively in series and energized by the stator voltage $V_1$, while the rotor resistance $r_r/S$ and rotor leakage reactance $\omega_e L_{lr}$ are shown connected in series across the magnetizing reactance. The stator current is identified as $i_1$ and the rotor current as $i_2$. In general, the torque $T$ developed by the machine is proportional to $i_2^2 r_r/S$, or at an arbitrary frequency $f_e(\omega_e = 2\pi f_e)$, $$T = K i_2^2 r_r/(f_e S), \tag{1}$$

where the fractional slip $S = (f_e - F_r)/F_e$. Thus, $$T = K i_2^2 r_r/(f_e - f_r), \tag{2}$$

where $f_e$ is the stator supply line frequency and $f_r$ is the rotor speed in Hz related to $n$, the actual mechanical rotor speed in rpm by $f_r = Pn/60$, $P$ being the number of pole pairs.

One possible method of torque control is to maintain the slip frequency $f_e - f_r$ and the rotor current $i_2$ constant. Reference to equation (2) verifies that torque will then be maintained constant. However, rotor current cannot readily be measured so that this type of control cannot be implemented.

Another type of control is provided by maintaining constant the real or in-phase component of the stator current $i_1$ relative to the stator voltage $V_1$. Neglecting resistance, it is clear from the equivalent circuit that the in-phase stator current component $i_{1,InPh}$ which flows into the motor terminals must also flow in the rotor resistance since all the other circuit elements are reactive. Hence, holding the slip frequency $f_e - f_r$ constant and the real or in-phase component of stator current $i_{1,InPh}$ also constant, then the rotor current $i_2$ is also maintained constant. This method has one serious drawback. The stator resistance is typically very small, and for high speeds the power flow into the motor terminals is nearly identical to the power crossing the air gap into rotor resistance $r_r/S$. However, as the stator supply line frequency is reduced (speed is reduced), the power dissipated by the stator resistance $r_s$ becomes appreciable compared to the power into the motor terminals. When this occurs, the rotor current $i_2$ is no longer maintained constant for a constant $i_{1,InPh}$ and, hence, the torque is no longer maintained constant. Assuming a variable operating frequency range of 50 Hz to 2.5 Hz, the change is especially pronounced as the line frequency is reduced from about 15 Hz to 2.5 Hz, particularly for negative torque or braking.

The difficulty involved in using and sensing the in-phase component of stator current, $i_{1,InPh}$, is overcome by compensating for the IR drop through the stator resistance. In this case, a voltage signal $v_1'$ is derived by sensing the motor terminal or supply line voltage ($v_1$) and the stator supply line current ($i_1$). It is evident from FIG. 1 that $$V_1' = V_1 - i_1 r_s. \qquad (3)$$

This modified voltage signal ($V_1'$) is now used as a reference and the modified in-phase stator current component $i'_{1,InPh}$ relative to this signal is determined. In an induction motor control method and a motor control circuit employing this technique, the modified in-phase stator current component $i'_{1,InPh}$ together with the slip frequency $f_e - f_r$ is held constant to regulate torque.

Figure 2:
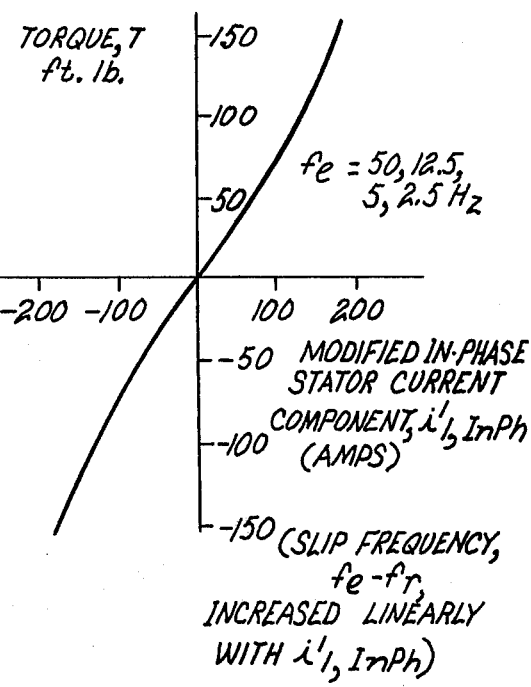
FIG. 2 is a curve of torque vs. the modified in-phase component of stator current for a typical induction motor controlled according to the principles herein taught, it being assumed that the slip frequency is increased linearly with the modified in-phase component of stator current.

FIG. 2 shows a common curve for torque versus the modified in-phase stator current component $i'_{1,InPh}$ for several different stator supply line or motor operating frequencies, in particular 50 Hz, 12.5 Hz, 5 Hz and 2.5 Hz, when the slip frequency $f_e - f_r$ is increased linearly with $i'_{1,InPh}$. The shape of the curve is independent of frequency, from which it follows that torque is maintained constant for a fixed $i'_{1,InPh}$ and $f_e - f_r$, and it will be noted that this holds true at negative as well as positive torque values. Although the use of the modified in-phase stator current component $i'_{1,InPh}$ as a controlled variable for regulating torque is not exact and more precisely can be said to give an approximation of the torque, the distinct advantage is that implementation of the control method and circuit based on equation (3) requires only sensing voltage and current parameters that are readily available external to the induction motor itself at the motor or supply line terminals. Modification of the motor or an appropriate air gap flux sensor is not required.

In the exemplary embodiment of a motor control circuit for regulating torque shown in block diagram form in FIG. 3, a conventional three-phase, squirrel cage ac induction motor is indicated generally at 10. As is apparent to those skilled in the art, the invention is also applicable with appropriate modifications to the control of wound rotor induction motors operated at a variable frequency. The wye-connected stator windings 11a–11c are respectively connected to the motor or supply line terminals 12a–12c, and the rotor speed at the motor shaft is continuously measured by a tachometer 13 which generates the signal $f_{rotor}$. A three-phase pulse width modulated inverter 14 is provided to supply the variable frequency induction motor 10 with constant volts/Hz power, so that the amplitude of the line voltage supplied to the motor decreases as the operating frequency decreases, and vice versa. Other suitable converters that can be used for this application are a three-phase square wave inverter or a polyphase cycloconverter. In accordance with the invention, the instantaneous single phase stator supply line current and voltage for each of the supply lines 14a–14c is continuously sensed and supplied as input information to the motor controller. To this end, the instantaneous line currents $i_{as}$–$i_{cs}$ corresponding to the per phase stator current is sensed by a suitable current sensor such as the current transformers 15a–15c. The instantaneous supply line voltages $v_{as}$–$v_{cs}$ corresponding to the per phase stator voltages between the respective motor terminals 12a–12c and neutral are also sensed by suitable voltage sensors such as the voltage transformers 16a–16c and filtered by the low pass filters 17a–17c to produce sine waves. It is usually preferable to sense an equivalent set of reference voltages that are present in the control circuits of inverter 14.

Generating means for computing and generating a dc signal proportional to or representative of the average value of the modified in-phase component of stator current, $i'_{1,InPh}$, is indicated generally at 20. In each phase, a computation circuit produces a signal representative of the voltage $V_1'$ as defined in FIG. 1, and this is used to obtain in each phase, preferably for both positive and negative currents, the modified in-phase component of stator current. These three (or six) currents are summed to produce the ac signal $i'_{1,InPh}$, which is in turn filtered to produce the dc signal $i'_{1,InPh(av.)}$. Only the computation and associated circuitry for phase A will be described, corresponding components in the other phases being designated by similar numerals. Thus, in the phase A computation circuit, the sensed instantaneous current $i_{as}$ is fed to a sign inverter 21a and then through a resistor 22a having the value $r_s$ to one input of a summing circuit 23a. The other input to the summing circuit 23a is the sensed instantaneous voltage signal $v_{as}$. Accordingly, the summing circuit 23a generates the signal $v_{as} - r_s i_{as}$, and an important feature of the invention is that this signal is compensated for the voltage drop across the stator resistance $r_s$.

Figure 4:
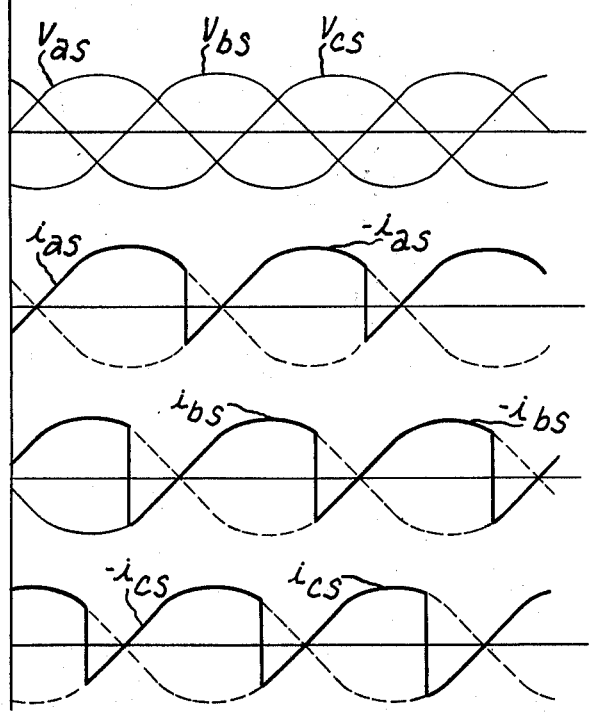
FIG. 4 are stator voltage and current waveforms useful in explaining the operation of the FIG. 3 motor controller.

A comparator circuit 24a connected to the output of summer 23a has a first binary output representing the positive half cycles of the signal $v_{as} - r_s i_{as}$. The binary one outputs are used to periodically time the closing of a switch 25a and complete a path for conduction of the positive current sensor signal $i_{as}$ through a resistor 26 to one input of the summing circuit 27. The value of resistor 26 is selected according to a predetermined proportionality constant. The in-phase component of the positive stator current $i_{as}$ which is passed by the switch 25a is more clearly understood by reference to FIG. 4. The upper waveform diagram, of course, shows the three-phase sine wave voltages, while in the second diagram the component of $i_{as}$ in phase with the voltage $v_{as}$ is illustrated in heavy lines. It will be appreciated from the foregoing discussion that the voltage $v_{as} - r_s i_{as}$ is slightly lagging with respect to $v_{as}$. The second waveform diagram also shows the negative stator current $-i_{as}$ with the in-phase component likewise illustrated in heavy lines. The current $-i_{as}$ is obtained at the output of inverter 21a, which in similar fashion is connected to a second switch 25a' that is closed by the complementary binary signal at the inverse logic output of comparator 24a. That is, switches 25a and 25a' are alternately closed for 180° intervals. The modified in-phase component of $-i_{as}$ is supplied through another resistor 26 to a second input of the summing circuit 27. The other two phases operate in similar fashion, it being understood that the binary outputs of comparator 24b and 24c are respectively displaced from one another and the output of comparator 24a by 120°. In the third and fourth diagrams of FIG. 4, the in-phase stator current components of $i_{bs}, -i_{bs}, i_{cs},$ and $-i_{cs}$ are shown in like manner in heavy lines. The sum of the six modified in-phase components of the stator currents is an ac signal with a sawtooth type waveshape as illustrated diagrammatically at 28 in FIG. 3. The low pass filter circuit 29 converts this to the averaged dc signal $i'_{1,InPh}$.

Referring now to the remainder of the motor controller, the desired value of torque or the command value of the modified in-phase stator current component, $i'_{1,InPh}$, is set manually or automatically by a suitable device such as a potentiometer 31 connected to a source of voltage V. In addition to adjusting the torque to a set value, it will be recalled from FIG. 2 that the slip frequency is increased linearly as the torque is increased. A feedback control circuit for setting the slip frequency and therefore the inverter operating frequency is comprised by a first summing circuit 32 for obtaining the error between the command value and the computed average value of the modified in-phase stator current component signal $i'_{1,InPh}$. The error signal is fed to a suitable slip frequency regulator 33 which performs the function of zeroing the error and generating an output signal proportional to the slip frequency $f_{slip}$. Preferably, the regulator 33 operates according to the rule $K_1(1+T_1S)/S$, where $K_1$ is a gain constant, $T_1$ is a time constant, and $S$ is a Laplace operator. A second summing circuit 34 determines the error between the slip frequency $f_{slip}$ and the measured rotor frequency $f_{rotor}$, this error signal being a control signal for determining the desired inverter operating frequency $f_{inverter}$. It will be appreciated that the inverter operating frequency corresponds to the variable frequency of the voltage supplied by the inverter 14 to the stator supply lines 14a-14c and thus to the variable operating frequency of induction motor 10.

A second feedback control circuit for setting the amplitude of the voltage supplied by inverter 14, which is adjusted in complementary fashion to obtain a constant volts/Hz as previously explained, is comprised by a proportional gain circuit 36 for converting the command value of the modified in-phase stator current component to a corresponding value of $f_{slip}$. The command value of the slip frequency and the $f_{slip}$ signal at the output of slip frequency regulator 33 are applied to another summing circuit 37. The error signal representing the difference between the command value of slip frequency and the slip frequency actually being asked for is fed to a two position switch 38 having a brake position and a motor position. Both of these are needed, of course, in a traction application where it is also necessary to regulate the torque during deceleration to a stop. In the motor position of switch 38, the error signal is fed through a sign inverter 39 to a voltage regulator 40 for producing an output control signal for the inverter 14 which is proportional to the inverter voltage amplitude to be obtained. In the brake position of switch 38, the error signal is fed directly to voltage regulator 40, which in either case performs the function of zeroing the error. The regulator 40 also preferably operates according to the rule $K_2(1+T_2S) S$, where the quantities are defined as before. The three-phase pulse width modulated power inverter 14 is of conventional construction, for example as described in the book "Principles of Inverter Circuits" by Bedford and Hoft, John Wiley and Sons, Inc., Copyright 1964, Library of Congress Catalog Card No.: 64-20078.

In view of the foregoing extensive discussion of the torque regulating control circuit for an induction motor operated at a variable frequency for traction and other applications, further description of the operation is not necessary. Although discussed with regard to the regulation of torque of a polyphase induction motor, the principles of the invention are also applicable to the control of single phase induction motors in an adjustable speed drive system. Instead of sensing the per phase stator supply line current and voltage parameters using the current transformers 15a-15c and voltage transformers 16a-16c it will be apparent to those skilled in the art that suitable parameters in the control circuit for power inverter 14 which effectively determine these output quantities may be sensed. Broadly speaking, by way of summary, the method for regulating the torque of an induction motor operated at a variable frequency comprises the steps of continuously sensing and generating a plurality of instantaneous sensor signals indicative of the per phase stator supply line current and voltage to be supplied to the stator winding, deriving from the instantaneous sensor signals a modified in-phase stator current component signal compensated for the voltage drop across the stator resistance, and utilizing the derived modified in-phase stator current component signal as a controlled variable in the motor control circuit to adjust in complementary fashion the frequency and the amplitude of the per phase stator supply line voltage, thereby regulating the torque of the induction motor.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A motor control circuit for regulating the torque of an induction motor having a stator winding and stator resistance comprising a power converter for supplying adjustable frequency and amplitude voltage to a plurality of stator supply lines suitable for connection to said stator winding, sensing means for continuously generating a plurality of instantaneous current and voltage sensor signals indicative of each instantaneous per phase stator supply line current and voltage, first means for combining said instantaneous sensor signals for each phase to derive a modified voltage signal indicative of the respective stator voltage compensated for the voltage drop across said stator resistance, and second means responsive to the modified voltage signal for each phase and the respective instantaneous current sensor signal for deriving a modified in-phase component of stator current signal representative of the component of stator current in phase with the compensated stator voltage, and feedback control means for utilizing said modified in-phase component of stator current signal and command signals representing the desired torque and slip frequency to derive therefrom control signals for said power converter which are effective to regulate the torque of the induction motor.

2. A motor control circuit according to claim 1 wherein said first and second means comprises means for inverting said instantaneous current sensor signal and conducting the inverted current sensor signal through a resistor having a value equal to the stator resistance to produce a first signal, a summing circuit for summing said first signal and instantaneous voltage sensor signal to produce a second signal, a comparator circuit for generating a binary signal representative of the positive and negative half cycles of said second signal, a first switch connected to the output of said comparator circuit and to said sensing means for generating the instantaneous current sensor signal so that said binary signal times the closing of said first switch to thereby generate said modified in-phase component of stator current signal.

3. A motor control circuit according to claim 2 wherein said first and second means further comprises a second switch connected to the output of said comparator circuit and to said inverting means so that said binary signal times the closing of said second switch alternating with respect to said first switch to generate during alternate half cycles a second modified in-phase component of stator current signal, and another summing circuit for summing said first-mentioned and second modified in-phase component of stator current signals.

4. A motor control circuit according to claim 2 wherein the induction motor is a polyphase induction motor supplied with adjustable frequency and amplitude polyphase voltage, another summing circuit for summing at least one said modified in-phase component of stator current signal generated for each phase, and filter means for filtering the summed modified in-phase component of stator current signals to produce an averaged dc signal to be fed to said feedback control means.

5. A motor control circuit according to claim 1 further including filter means for producing an averaged modified in-phase component of stator current signal, and said feedback control means includes a first feedback control circuit comprised by a first summing circuit for summing said averaged signal and one command signal representing the desired torque to generate a first error signal, a slip frequency regulator actuated by said first error signal and producing a slip frequency signal, and a second summing circuit for summing said slip frequency signal and a rotor frequency signal and producing one control signal for determining the frequency of the voltage supplied by said power converter, a second feedback control circuit comprised by a third summing circuit for summing the other command signal representing the desired slip frequency and said slip frequency signal to generate a third error signal, and a voltage regulator actuated by said third error signal and producing the other control signal for determining in complementary fashion the amplitude of the voltage supplied by said power converter.

6. A motor control circuit according to claim 5 wherein said second feedback control circuit further includes a two-position switch between said third summing circuit and voltage regulator which is movable between a brake contact and a motor contact, and an inverter connected between said motor contact and voltage regulator.

7. A method for regulating the torque of an induction motor having a stator winding and stator resistance and which is operated at a variable frequency by a motor control circuit, said method comprising the steps of continuously sensing and generating a plurality of instantaneous current and voltage sensor signals indicative of each instantaneous per phase stator supply line current and voltage to be supplied to said stator winding, deriving from said instantaneous sensor signals for each phase a modified voltage signal indicative of the respective stator voltage compensated for the voltage drop across said stator resistance, and further deriving from said modified voltage signal for each phase and from the respective instantaneous current sensor signal a modified in-phase component of stator current signal which is representative of the component of stator current in phase with the compensated stator voltage, and utilizing said modified in-phase component of stator current signal as a controlled variable in said motor control circuit to adjust in complementary fashion the frequency and amplitude of each per phase stator supply line voltage so as to regulate the torque of the induction motor.

* * * * *